(12) United States Patent
Tanila et al.

(10) Patent No.: US 12,481,278 B2
(45) Date of Patent: Nov. 25, 2025

(54) EXTRAPOLATING MOTOR ENERGY CONSUMPTION BASED ON DIGITAL TWIN

(71) Applicant: ABB Schweiz AG, Baden (CH)

(72) Inventors: Teemu Tanila, Helsinki (FI); Olli Alkkiomäki, Helsinki (FI); Joni Siimesjärvi, Laihia (FI)

(73) Assignee: ABB Schweiz AG, Baden (CH)

( * ) Notice: Subject to any disclaimer, the term of this patent is extended or adjusted under 35 U.S.C. 154(b) by 431 days.

(21) Appl. No.: 18/055,625

(22) Filed: Nov. 15, 2022

(65) Prior Publication Data

US 2023/0152768 A1 May 18, 2023

(30) Foreign Application Priority Data

Nov. 15, 2021 (EP) ..................... 21208273

(51) Int. Cl.
*G05B 23/02* (2006.01)
*G06N 5/04* (2023.01)
*G06Q 10/20* (2023.01)

(52) U.S. Cl.
CPC ......... *G05B 23/0283* (2013.01); *G06N 5/041* (2013.01); *G06Q 10/20* (2013.01)

(58) Field of Classification Search
CPC ..... G05B 23/0283; G06N 5/041; G06Q 10/20
See application file for complete search history.

(56) References Cited

U.S. PATENT DOCUMENTS

| | | | |
|---|---|---|---|
| 2019/0302712 A1 | 10/2019 | Neti et al. | |
| 2019/0325663 A1* | 10/2019 | Brim | G07C 3/02 |
| 2021/0248289 A1 | 8/2021 | Fasano | |
| 2022/0027529 A1* | 1/2022 | Zarur | G06F 30/12 |
| 2023/0251606 A1* | 8/2023 | Nair | G05B 17/02 700/28 |

FOREIGN PATENT DOCUMENTS

| | | |
|---|---|---|
| CN | 111562769 A | 8/2020 |
| CN | 111860899 A | 10/2020 |
| CN | 112101899 A | 12/2020 |
| CN | 112106053 A | 12/2020 |
| WO | 2021219438 A1 | 11/2021 |

OTHER PUBLICATIONS

European Search Report; Application No. 21208273.9; Completed: Apr. 28, 2022; 1 Page.
Chinese Office Action; Application No. 202211405175.1; Issued Date: Jul. 31, 2025; 14 Pages.

* cited by examiner

*Primary Examiner* — Michael W Choi
(74) *Attorney, Agent, or Firm* — Whitmyer IP Group LLC

(57) ABSTRACT

Disclosed is a method comprising obtaining a set of process data associated with an industrial process, wherein the set of process data includes measured values associated with the industrial process over a time period; estimating at least an energy consumption of each motor of a plurality motors over the time period based at least partly on the set of process data and a plurality of digital twins associated with the plurality of motors, wherein the plurality of digital twins includes at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

14 Claims, 4 Drawing Sheets

EXTRAPOLATING MOTOR ENERGY CONSUMPTION BASED ON DIGITAL TWIN

FIELD

The following exemplary embodiments relate to industrial automation and to industrial communication networks.

BACKGROUND

Proper dimensioning and selection of a motor is key to ensuring performance and reliability. Incorrectly dimensioned motors may result in reduced energy efficiency, accelerated component aging, and increased maintenance needs due to excessive physical stress from operating in a suboptimal environment.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: obtain a set of process data associated with an industrial process, wherein the set of process data includes measured values associated with the industrial process over a time period; estimate at least an energy consumption of each motor of a plurality motors over the time period based at least partly on the set of process data and a plurality of digital twins associated with the plurality of motors, wherein the plurality of digital twins includes at least a first digital twin of a first motor and a second digital twin of a second motor different to the first motor; extrapolate at least the energy consumption of each motor of the plurality of motors over an expected total useful lifetime of each motor; and indicate at least the extrapolated energy consumption of each motor of the plurality of motors.

According to another aspect, there is provided an apparatus comprising means for: obtaining a set of process data associated with an industrial process, wherein the set of process data comprises measured values associated with the industrial process over a time period; estimating at least an energy consumption of each motor of a plurality motors over the time period based at least partly on the set of process data and a plurality of digital twins associated with the plurality of motors, wherein the plurality of digital twins comprises at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

According to another aspect, there is provided a method comprising: obtaining a set of process data associated with an industrial process, wherein the set of process data includes measured values associated with the industrial process over a time period; estimating at least an energy consumption of each motor of a plurality motors over the time period based at least partly on the set of process data and a plurality of digital twins associated with the plurality of motors, wherein the plurality of digital twins includes at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

According to another aspect, there is provided a computer-implemented method comprising: obtaining a set of process data associated with an industrial process, wherein the set of process data includes measured values associated with the industrial process over a time period; estimating at least an energy consumption of each motor of a plurality motors over the time period based at least partly on the set of process data and a plurality of digital twins associated with the plurality of motors, wherein the plurality of digital twins includes at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

According to another aspect, there is provided a computer program product comprising program instructions which, when run on a computing apparatus, cause the computing apparatus to perform at least the following: obtaining a set of process data associated with an industrial process, wherein the set of process data comprises measured values associated with the industrial process over a time period; estimating at least an energy consumption of each motor of a plurality motors over the time period based at least partly on the set of process data and a plurality of digital twins associated with the plurality of motors, wherein the plurality of digital twins comprises at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

According to another aspect, there is provided a computer program comprising instructions for causing an apparatus to perform at least the following: obtaining a set of process data associated with an industrial process, wherein the set of process data comprises measured values associated with the industrial process over a time period; estimating at least an energy consumption of each motor of a plurality motors over the time period based at least partly on the set of process data and a plurality of digital twins associated with the plurality of motors, wherein the plurality of digital twins comprises at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

According to another aspect, there is provided a computer readable medium comprising program instructions for causing an apparatus to perform at least the following: obtaining a set of process data associated with an industrial process, wherein the set of process data comprises measured values associated with the industrial process over a time period; estimating at least an energy consumption of each motor of a plurality motors over the time period based at least partly on the set of process data and a plurality of digital twins associated with the plurality of motors, wherein the plurality of digital twins comprises at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

According to another aspect, there is provided a non-transitory computer readable medium comprising program instructions for causing an apparatus to perform at least the following: obtaining a set of process data associated with an industrial process, wherein the set of process data includes measured values associated with the industrial process over a time period; estimating at least an energy consumption of each motor of a plurality motors over the time period based at least partly on the set of process data and a plurality of digital twins associated with the plurality of motors, wherein the plurality of digital twins includes at least a first digital twin of a first motor and a second digital twin of a second motor different to the first motor; extrapolating at least the energy consumption of each motor of the plurality of motors over an expected total useful lifetime of each motor; and indicating at least the extrapolated energy consumption of each motor of the plurality of motors.

According to another aspect, there is provided a system comprising at least a cloud server and a user device. The cloud server comprises means for: obtaining a set of process data associated with an industrial process, wherein the set of process data comprises measured values associated with the industrial process over a time period; estimating at least an energy consumption of each motor of a plurality motors over the time period based at least partly on the set of process data and a plurality of digital twins associated with the plurality of motors, wherein the plurality of digital twins comprises at least a first digital twin of a first motor and a second digital twin of a second motor different to the first motor; extrapolating at least the energy consumption of each motor of the plurality of motors over an expected total useful lifetime of each motor; and indicating, to the user device, at least the extrapolated energy consumption of each motor of the plurality of motors. The user device comprises means for: displaying, to a user, at least the extrapolated energy consumption of each motor of the plurality of motors.

According to another aspect, there is provided a system comprising at least a cloud server and a user device. The cloud server is configured to: obtain a set of process data associated with an industrial process, wherein the set of process data includes measured values associated with the industrial process over a time period; estimate at least an energy consumption of each motor of a plurality motors over the time period based at least partly on the set of process data and a plurality of digital twins associated with the plurality of motors, wherein the plurality of digital twins includes at least a first digital twin of a first motor and a second digital twin of a second motor different to the first motor; extrapolate at least the energy consumption of each motor of the plurality of motors over an expected total useful lifetime of each motor; and indicate, to the user device, at least the extrapolated energy consumption of each motor of the plurality of motors. The user device is configured to: display, to a user, at least the extrapolated energy consumption of each motor of the plurality of motors.

BRIEF DESCRIPTION OF THE DRAWINGS

In the following, various exemplary embodiments will be described in greater detail with reference to the accompanying drawings, in which.

DETAILED DESCRIPTION

Figure 1:
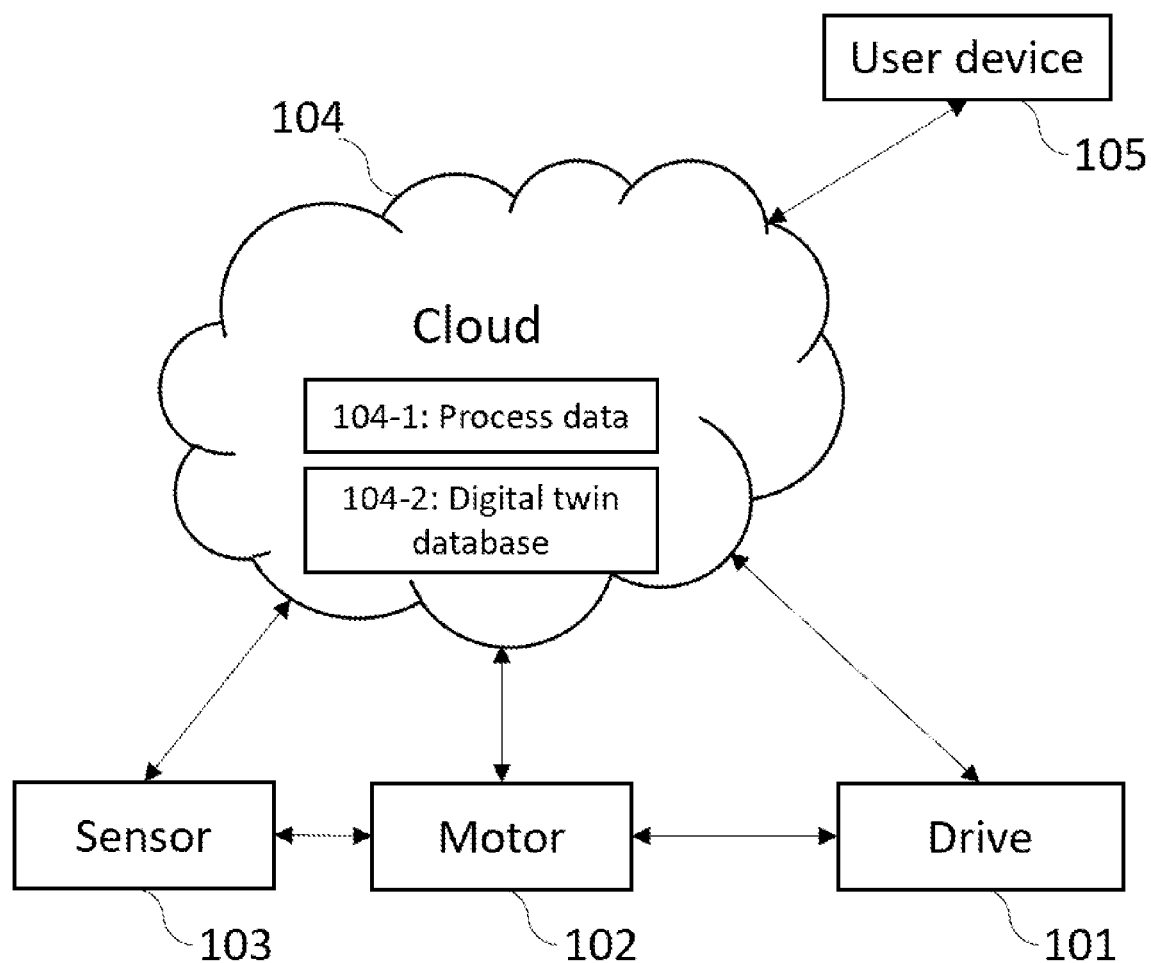
FIG. 1 illustrates a communication system to which some exemplary embodiments may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The following embodiments are exemplary. Although the specification may refer to "an", "one", or "some" embodiment(s) in several locations of the text, this does not necessarily mean that each such reference is made to the same embodiment(s), or that a particular feature only applies to a single embodiment. Single features of different embodiments may also be combined to provide other embodiments.

Various exemplary embodiments may be applicable to any process in an industrial plant, including a processing system and/or an industrial manufacturing related process and/or a system for a technical process, which is at least partly automated, providing different measured/sensored values for a plurality of variables on one or more devices (equipment) and/or on one or more processes. A non-limiting list of examples includes power plants, pulp and paper plants, manufacturing plants, chemical processing plants, power transmission systems, mining and mineral processing plants, oil and gas systems, data centers, ships, and transportation fleet systems.

Different embodiments and examples are described below using single units, models, equipment and memory, without restricting the embodiments/examples to such a solution. Concepts called cloud computing and/or virtualization may be used. Virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN) may cause one or more of the functionalities described below to be migrated to any corresponding abstraction or apparatus or device. Therefore, all words and expressions should be interpreted broadly, and they are intended to illustrate, not to restrict, the exemplary embodiments.

When commissioning a new motor, the motor may be dimensioned (i.e., sized) based on the expected requirements of an industrial process in order to select a motor that is suitable for the process. However, the requirements of the process may change over time and become different than they were expected to be during the commissioning of the motor. For example, the initial dimensioning of the motor may be based on over-estimating the actual throughput of the process, which may lead to over-dimensioning of the motor. Thus, the initially commissioned motor may not be optimally suited for the process considering the changed requirements of the process. Proper dimensioning and selection of a motor is key to ensuring performance and reliability. Incorrectly dimensioned motors may still fulfil the requirements of the process, but result in reduced energy efficiency, accelerated component aging, and increased maintenance needs during the expected total useful lifetime of the motor (e.g., 20 years) due to excessive physical stress from operating in a suboptimal environment.

Some exemplary embodiments may enable retroactive motor optimization by considering the expected total useful lifetime of the motor, as well as the process requirements. The retroactive motor optimization means that the initially commissioned motor is replaced with another motor that is more optimally suited for the requirements of the process. For example, some exemplary embodiments may help to select a more optimal motor, such that the overall energy consumption and/or the maintenance needs are reduced over the expected total useful lifetime of the motor. This may be accomplished by creating a simulation (virtual representation) of the industrial process by using a digital twin of the motor based on collected real process data, such as speed and torque over time, environmental conditions, etc. A digital twin is a virtual representation (or virtual model) that serves as the digital counterpart of a physical object, system, or process. Once the process data has been collected over a certain monitoring time period, the performance (e.g., energy consumption) of the existing motor during the monitoring time period may be estimated and extrapolated throughout the expected total useful lifetime of the motor based on the simulation. This estimation and extrapolation may then be applied to digital twins of different motors in order to find the motor that provides the best performance (e.g., lowest energy consumption during the expected total useful lifetime of the motor).

FIG. 1 illustrates a communication system to which some exemplary embodiments may be applied. Referring to FIG. 1, some exemplary embodiments may be based on wireless communications, such as 3G (third generation), 4G (fourth generation), LTE (long term evolution), LTE-A (long term evolution advanced), 5 G (fifth generation), 5 G NR (new radio), UMTS (universal mobile telecommunications system), EDGE (enhanced data rates for GSM evolution), WCDMA (wideband code division multiple access), Bluetooth, WLAN (wireless local area network), Wi-Fi, Li-Fi (light fidelity) or any other mobile or wireless network. The communication may also occur between nodes belonging to different but compatible systems, such as LTE and 5 G. Alternatively, some exemplary embodiments may be based on wired connections, at least partly.

It should be noted that FIG. 1 illustrates a simplified system architecture only showing some elements and functional entities, all being logical units whose implementation may differ from what is shown. The connections shown in FIG. 1 are logical connections; the actual physical connections may be different. Data collection may use so-called master protocols, in which a master network node subscribes data from slaves (devices whose data it wants to have), and a slave device/network node sends its data to the receiver/master based on query or automatically based on subscription. It is apparent to a person skilled in the art that the systems also comprise other functions and structures. It should be appreciated that the functions, structures, elements, and protocols used in or for communication are irrelevant to the exemplary embodiments. Therefore, they need not be discussed in more detail here.

The system may comprise a variable speed drive 101. The variable speed drive may also be referred to as a variable frequency drive. The variable speed drive 101 may be used to run machinery, such as a motor 102 and/or a pump, at different speeds. The variable speed drive 101 may be electrically connected to the machinery. The motor 102 may also be referred to as an electric motor, or an induction motor, or an alternating current (AC) motor. The variable speed drive 101 may comprise or be connected to a controller, for example a proportional-integral-derivative (PID) controller. The controller may be configured to send control signals to the variable speed drive 101. The variable speed drive 101 may control highly dynamic industrial processes, in which for example the speed or torque applied to the motor 102 has to be varied according to the needs of the industrial process.

The variable speed drive 101 may store, for example in an internal memory or in an external memory, information on control parameter settings, for example present values of control parameters such as controller gains, ramp times, motor data, limits, magnetization settings, signal filtering settings, and/or motor control settings. The variable speed drive 101 may also store operational information recorded during the operation of the variable speed drive, for example information on key performance indicators, such as load current histogram, torque ripple, torque vs. speed curves, and/or power vs. speed curves, temperature, voltage, current, and/or other information such as resonance frequencies and/or load inertias.

The variable speed drive 101 may be equipped with a short-range communication interface, such as Bluetooth, Ethernet, ZigBee, Li-Fi, Wi-Fi, wireless mesh network, near field communication (NFC), or any other wireless or wired connection. The short-range communication interface may be comprised, for example, in the variable speed drive 101 or in a control panel of the variable speed drive 101. The variable speed drive 101 may be configured to communicate with the motor 102 and/or one or more sensor devices 103 via the short-range communication interface.

Furthermore, the variable speed drive 101 may be connected to the internet via a network interface, such as 3G, 4G, LTE, LTE-A, 5 G, 5 G NR, UMTS, EDGE, WCDMA, WLAN, Wi-Fi, Li-Fi, or any other mobile, wireless or wired network. The network interface may be comprised, for example, in the variable speed drive 101 or in a control panel of the variable speed drive 101. The variable speed drive 101 may be connected to a cloud server 104 via the network interface. The variable speed drive 101 may be connected to the cloud server directly (e.g., via cellular link), or via a gateway device such as an edge gateway. The variable speed drive 101 may be configured to exchange information, i.e., to transmit and/or receive data, with the cloud server 104. For example, the variable speed drive 101 may be configured to transmit warning and failure logs, real-time operational information, and/or the existing control parameter settings of the variable speed drive 101 to the cloud server 104. The existing control parameter settings refer to the control parameters currently applied at the variable speed drive 101.

The motor 102 may be equipped with a short-range communication interface, such as Bluetooth, Ethernet, ZigBee, Li-Fi, Wi-Fi, wireless mesh network, NFC, or any other wireless or wired connection. The motor 102 may be configured to communicate with the variable speed drive 101 and/or the one or more sensor devices 103 via the short-range communication interface.

Furthermore, the motor 102 may be connected to the internet via a network interface, such as 3G, 4G, LTE, LTE-A, 5 G, 5 G NR, UMTS, EDGE, WCDMA, WLAN, Wi-Fi, Li-Fi, or any other mobile, wireless or wired network. The motor 102 may be connected to the cloud server 104 via the network interface. The motor 102 may be connected to the cloud server directly (e.g., via cellular link), or via the variable speed drive 101, or via a gateway device such as an edge gateway. The motor 102 may be configured to exchange information, i.e., to transmit and/or receive data, with the cloud server 104. For example, the motor 102 may be configured to transmit real-time process data and/or historical process data to the cloud server 104. The process data may comprise, for example, measured values of speed, torque, and/or temperature of the motor over time. The process data may also comprise measured values for environmental conditions, such as external temperature and/or humidity outside the motor. The process data may be associated with an industrial process that the motor 102 is part of.

The process data may be measured by the one or more sensor devices 103. The one or more sensor devices 103 may be comprised in the motor 102, or attached to the motor 102, or in close proximity to the motor 102. The one or more sensor devices 103 may be configured to measure, for example, speed, torque, and/or temperature of the motor 102. For example, there may be separate sensor devices for measuring speed and temperature, respectively. At least one of the one or more sensor devices 103 may be configured to measure environmental conditions, such as temperature, in the external environment of the motor 102.

Furthermore, the variable speed drive 101 may be configured to measure additional process data, such as switching frequency, slip and flux associated with the motor 102. The switching frequency may refer to the rate at which the direct current (DC) bus voltage is switched on and off during the pulse width modulation process. The slip may refer to the difference between the synchronous speed (speed of rotation of the motor's magnetic field) and rotor speed (speed of the rotatory part of the motor). Slip may be expressed as a ratio of the rotor speed and the synchronous speed. The flux may refer to the magnetic flux of the motor's magnetic field.

The one or more sensor devices 103 may be equipped with a short-range communication interface, such as Bluetooth, Ethernet, ZigBee, Li-Fi, Wi-Fi, wireless mesh network, NFC, or any other wireless or wired connection. The one or more sensor devices may be configured to communicate with the motor 102 and/or the variable speed drive 101 via the short-range communication interface. For example, the one or more sensor devices 103 may be configured to transmit the measured process data to the motor 102 and/or to the variable speed drive 101 via the short-range communication interface.

Furthermore, the one or more sensor device 103 may be connected to the internet via a network interface, such as 3G, 4G, LTE, LTE-A, 5 G, 5 G NR, UMTS, EDGE, WCDMA, WLAN, Wi-Fi, Li-Fi, or any other mobile, wireless or wired network. The one or more sensor devices 103 may be connected to the cloud server 104 via the network interface. The one or more sensor devices 103 may be connected to the cloud server directly (e.g., via cellular link), or via a gateway device such as an edge gateway. The one or more sensor devices 103 may be configured to exchange information, i.e., to transmit and/or receive data, with the cloud server 104. For example, the one or more sensor devices 103 may be configured to transmit the measured process data to the cloud server 104.

The cloud server 104 may be configured to exchange information, i.e., to transmit and/or receive data, with the variable speed drive 101, the motor 102, the one or more sensor devices 103, and/or with a user device 105. The cloud server 104 may further be configured to store the received information, for example the received process data, in at least one memory 104-1.

The cloud server 104 may be configured to simulate the industrial process by using a digital twin of the motor 102 and the received process data. The cloud server 104 may further be configured to simulate the industrial process based on the process data and a digital twin of one or more other motors different to the motor 102. The cloud server 104 comprises a digital twin database 104-2, which comprises the digital twins of the motor 102 and the one or more other motors. The digital twins may be pre-defined models provided by the manufacturer(s) of the motors. Alternatively, the digital twins may be user-defined models. The digital twin database 104-1 may also comprise digital twins of other devices and/or systems, for example of the variable speed drive 101.

The cloud server 104 may be configured to estimate, based on the simulation, the energy consumption and/or maintenance needs of the motor 102 and the one or more other motors.

The cloud server 104 may be configured to extrapolate, or predict, based on the estimating, the energy consumption and/or maintenance needs of the motor 102 and the one or more other motors over the expected total useful lifetime of a given motor.

The cloud server 104 may further be connected to a user device 105. For example, the cloud server 104 may be configured to indicate the extrapolated energy consumption of each motor, the extrapolated maintenance needs of each motor, and/or a recommended motor to the user device 105. The user device 105 may be configured to display, or visualize, the extrapolated energy consumption of each motor, the extrapolated maintenance needs of each motor, and/or the recommended motor to a user of the user device 105 for example in a graphical user interface.

The user device 105 may comprise user equipment such as a smartphone, mobile phone, tablet computer, laptop computer, desktop computer, or any other computing device. The user device 105 may be a remote device located at a different site than the motor 102. Alternatively, the user device 105 may be a local device located on-site at a close proximity to the motor 102.

The user device 105 may be connected to the internet via a network interface, such as 3G, 4G, LTE, LTE-A, 5 G, 5 G NR, UMTS, EDGE, WCDMA, WLAN, Wi-Fi, Li-Fi, Ethernet, or any other mobile, wireless or wired network. The user device 105 may be configured to exchange information, i.e., to transmit and/or receive data, with the cloud server 104 via the network interface.

The user device 105 may be equipped with a short-range communication interface to provide a local connection to the variable speed drive 101, to the motor 102, and/or to the one or more sensor devices 103. The short-range communication interface may be, for example, Bluetooth, Ethernet, ZigBee, Wi-Fi, Li-Fi, wireless mesh network, NFC, or any other wireless or wired connection. The user device 105 may be configured to exchange information, i.e., to transmit and/or receive data, with the variable speed drive 101 and/or with the motor 102. For example, the user device 105 may be configured to transmit control parameters and/or other configuration changes to the variable speed drive 101 and/or to the motor 102. As another example, the user device 105 may be configured to forward the process data from the variable speed drive 101, the motor 102, and/or the one or more sensor devices 103 to the cloud server 105 (i.e., the user device 105 may act as a gateway).

Figure 2:
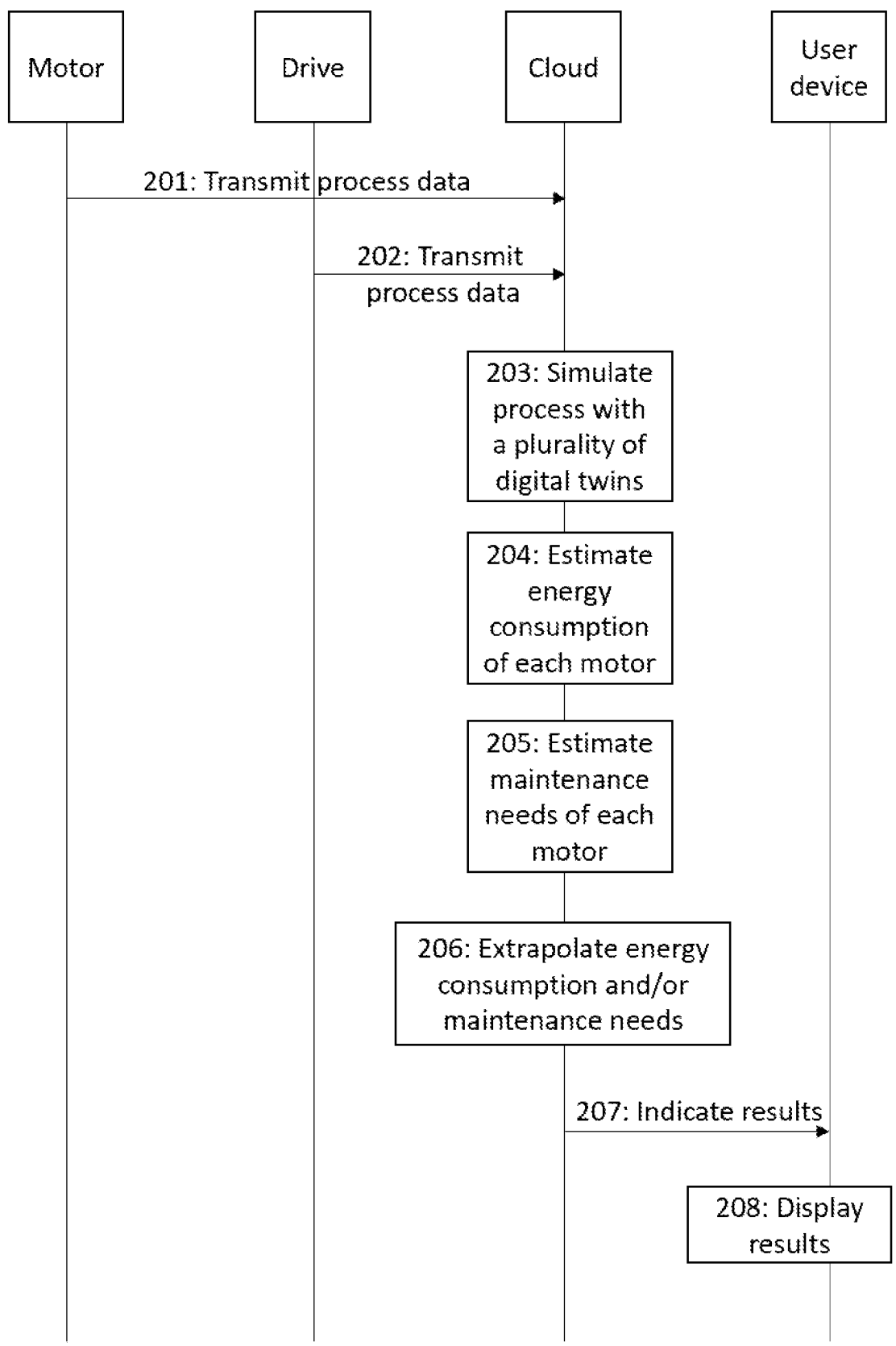
FIG. 2 illustrates a signaling diagram according to an exemplary embodiment.

FIG. 2 illustrates a signaling diagram according to an exemplary embodiment. In this exemplary embodiment, real process data associated with an initially commissioned motor is collected and used for retroactive motor optimization. After process data has been gathered, the operating environment of the motor is simulated in the cloud. The process may be simulated with digital twins of several different motors, keeping track of efficiency and consumed energy, and estimating physical stress and maintenance needs based on the motor and component lifetime models. This data may then be extrapolated over the expected total useful lifetime of a given motor in order to estimate the total energy consumption and/or maintenance needs over the expected total useful lifetime of the motor.

Referring to FIG. 2, the initially commissioned motor transmits 201 a set of process data associated with an industrial process to a cloud server, wherein the process data comprises measured values of the industrial process over a certain monitoring time period. Alternatively, the set of process data may be transmitted to the cloud server by a variable speed drive and/or one or more sensor devices connected to the motor. The process data may comprise, for example, speed values, torque values, and/or temperature values of the initially commissioned motor over the monitoring time period. The process data may further comprise measured values for environmental conditions, such as temperature and/or humidity, associated with the industrial process over the monitoring time period. In other words, the process data is obtained by using the initially commissioned motor (the real physical motor) with the (real) industrial process.

If the motor is connected to a variable speed drive, then the variable speed drive may also transmit 202 additional process data to the cloud server. The additional process data may comprise, for example, measured values for switching frequency, slip, and/or flux associated with the motor.

The cloud server may retroactively collect the process data for the monitoring time period after the motor has been commissioned. Alternatively, the data collection may be started immediately (or almost immediately), when the motor is installed and started for the first time.

The monitoring time period for the data collection should be long enough to determine what kind of operation is required by the industrial process (i.e., to determine the requirements of the industrial process). The monitoring time period depends on the type of the process, and it may range from several days to over a year. A shorter monitoring time period may be adequate for processes with less variation, such as a constant-speed pump application in optimal environmental conditions. Longer time periods may be used to track seasonal changes in the process and in the environmental conditions.

Once the process data has been collected, the cloud server simulates 203 the monitored industrial process in parallel with each digital twin of a plurality of digital twins (motor models) associated with a plurality of different motors (motor types) in the cloud server. The different motors may refer to motors with different capabilities or capacities, for example operating with a different speed, electrical power, and/or torque compared to each other.

The process may also be simulated with a digital twin of the initially commissioned motor in order to provide comparable results in relation to the other (simulated) motors, since there may be some inaccuracy in the simulation model compared to the real process. Alternatively, the performance (e.g., energy consumption) of the initially commissioned motor may be estimated by using the actual physical motor with the real industrial process, instead of simulating the industrial process with a digital twin of the initially commissioned motor. The real performance of the initially commissioned motor may then be compared to the simulated performance of the other motors.

While the simulation is running, the cloud server may keep track of possible parameters to be optimized. For example, the cloud server may estimate 204 at least an energy consumption of each motor over the monitoring time period based on the simulation performed for that particular motor.

The cloud server may also estimate 205 the maintenance needs of each motor over the monitoring period. With accurate digital twins (motor models) and information about the operating environment of the motor, it is possible to monitor the motor heating and cooling, and estimate how they impact the maintenance needs of the motor. In other words, the maintenance needs of a given motor may be estimated based at least partly on temperature values indicated by the digital twin corresponding with that particular motor during the simulation.

The cloud server extrapolates 206 the energy consumption and/or maintenance needs of each motor over the expected total useful lifetime of each particular motor. The extrapolating may also be referred to as predicting. Thus, the cloud server may estimate the overall energy efficiency and total wasted energy of a given motor over the expected total useful lifetime of the motor.

The extrapolation may indicate how the energy consumption and maintenance needs would develop over the expected total useful lifetime of each motor. For example, the following equation may be used to estimate the total cost of a given motor, wherein the total cost represents the total energy consumption and maintenance needs for a given motor over its expected total useful lifetime:

$$\text{Total cost} = \frac{TUL}{T_1 - T_0} * \left( \int_{T_0}^{T_1} P_E(t)dt * x + \text{Maintenance cost} \right) + (\text{initial cost})$$

where TUL is the expected total useful lifetime of the motor, $T_o$ is the start of the monitoring time period, $T_1$ is the end of the monitoring time period, $P_E$ is the monitored electrical power of the motor at a given time instance t (e.g., in kilowatts), and x is an estimate for energy cost per kilowatt-hour (kWh).

In order to compare the performance of different motors with each other, the total cost per time unit can be used. Thus, the motor with the lowest total cost per time unit may be determined as the optimal motor for the process. The total cost per time unit may be defined, for example, as:

$$\text{Total cost per time unit} = \frac{\text{Total cost}}{TUL}$$

The expected total useful lifetime (TUL) is equal to the expected remaining useful lifetime (RUL) for a brand-new motor. The expected total useful lifetime of a given motor may comprise a time window starting from the installation, or commissioning, of the motor to the expected decommissioning of the motor. The expected total useful lifetime may include the monitoring time period, during which the process data is collected by using the initially commissioned motor.

The expected total useful lifetime may be different for different motors. In addition, the expected total useful lifetime of a given motor may not be constant, as it may vary depending on the operating conditions and/or environmental conditions of the motor. For example, the bearing lifetime of the motor may depend on the estimated temperature of the bearing and the usage speed of the motor.

The operating conditions and/or environmental conditions may be indicated by the process data, which is collected over the monitoring time period by using the initially commissioned motor (i.e., the real physical motor). The operating conditions and/or environmental conditions over the expected total useful lifetime of a given motor may be assumed to correspond to the operating conditions and/or environmental conditions observed during the monitoring time period.

The expected total useful lifetime of a given motor may be determined based on the collected process data and/or environmental data by using a manufacturer lifetime model of that particular motor. The lifetime model defines the expected total useful lifetime for one or more components (e.g., a bearing) of the motor in given operating conditions and/or environmental conditions. Based on the monitored operating conditions (e.g., stress) and/or environmental conditions during the monitoring time period, the expected total useful lifetime of each motor can be determined in these specific conditions. Thus, the expected total useful lifetime of the initially commissioned motor is comparable to the expected total useful lifetime of the other motors.

The maintenance cost is used as a metric to represent the maintenance needs of the motor. The maintenance cost may be omitted, if the amount does not change between different motors and is assumed to be constant. In addition, the total cost may include some initial cost for purchasing the motor and installing it in order to evaluate whether it would be beneficial to replace the initially commissioned motor with a new one.

The motor may be used for a repetitive industrial application or a more dynamic industrial application. In more dynamic applications, some additional simulations may be run compared to repetitive applications, in order to see what happens to the estimated results of energy consumption and maintenance needs, if the process requirements change.

The cloud server indicates 207, to a user device, the extrapolated results comprising the extrapolated energy consumption and/or maintenance needs of each motor over the expected total useful lifetime of each motor. Thus, the results indicate how energy efficient the existing motor (i.e., the initially commissioned motor) is compared to the other (simulated) motors. In other words, the results indicate whether it would be beneficial to replace the initially commissioned motor with some other motor that is more energy efficient and/or has lower maintenance needs than the existing motor over the expected total useful lifetime of the motor. For example, the motor associated with the lowest extrapolated total cost may be the motor that is the most energy efficient and/or has the lowest maintenance needs for the industrial process. In addition, the cloud server may explicitly indicate (or recommend), to the user device, the optimal motor with the lowest extrapolated energy consumption, and/or the lowest combined extrapolated energy consumption and extrapolated maintenance needs, among the plurality of motors.

The user device may display 208, or visualize, the recommended motor and/or the extrapolated results of the different motors to the user of the user device for example via a graphical user interface. The user may then decide to replace the initially commissioned motor for example with the recommended motor in order to retroactively optimize the motor.

Figures 3, 4:
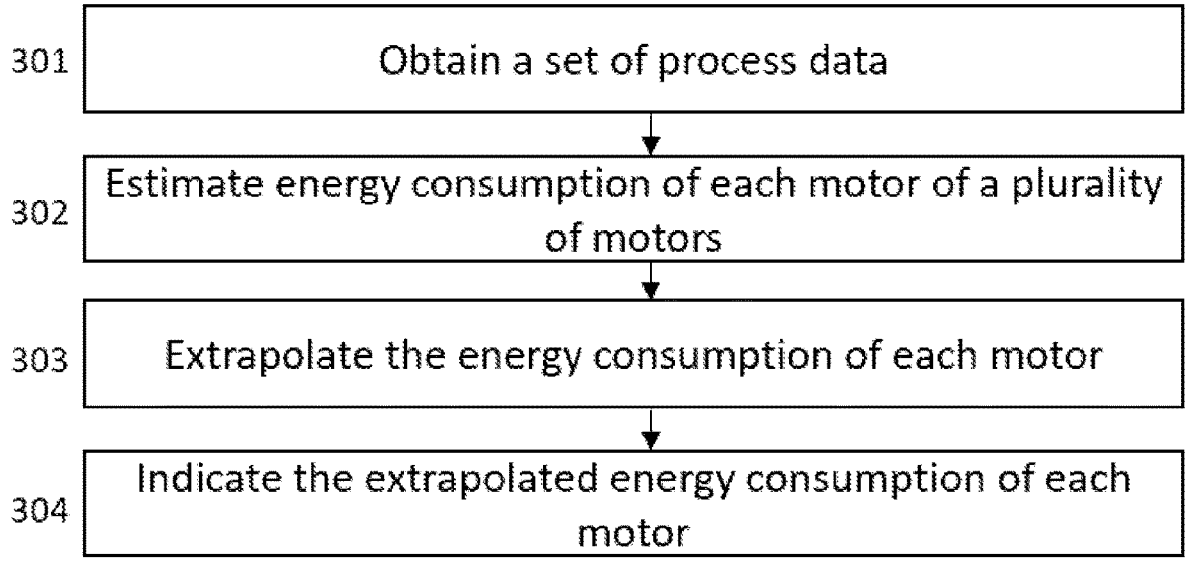
FIGS. 3-4 illustrate flow charts according to some exemplary embodiments.

FIG. 3 illustrates a flow chart according to an exemplary embodiment. The functions illustrated in FIG. 3 may be performed by an apparatus such as, or comprised in, a cloud server or any other computing device.

Referring to FIG. 3, a set of process data associated with an industrial process is obtained 301, wherein the set of process data comprises measured values associated with the industrial process over a time period. The time period refers to the monitoring time period.

The set of process data may be obtained by using the initially commissioned motor (i.e., the real motor) with the industrial process. At least a subset of the set of process data may be obtained by receiving it from the initially commissioned motor, and/or from a variable speed drive connected to the initially commissioned motor, and/or from one or more sensor devices. The initially commissioned motor may also be referred to as a third motor herein.

At least an energy consumption of each motor of a plurality motors over the time period is estimated 302 based at least partly on the set of process data and a plurality of digital twins associated with the plurality of motors, wherein the plurality of digital twins comprises at least a first digital twin of the first motor and a second digital twin of a second motor different to the first motor. In other words, the energy consumption amount per motor consumed during the time period is estimated, but the estimation itself is not necessarily performed during the time period.

The energy consumption and/or maintenance needs of the third motor (the initially commissioned motor) over the time period may be estimated based on a third digital twin of the third motor. Alternatively, the energy consumption and/or maintenance needs of the third motor over the time period may be estimated by using, or operating, the third motor (i.e., the real physical motor) with the real industrial process instead of using a digital twin of the third motor.

At least the energy consumption of each motor (i.e., per motor) of the plurality of motors over an expected total useful lifetime of each motor is extrapolated 303. In other words, the energy consumption of a given motor may be extrapolated over a time window starting from the installation/commissioning of that motor and ending at the expected decommissioning of that motor, wherein the time window comprises the time period during which the measured values in the process data are collected. For example, the energy consumption of the first motor may be extrapolated over the expected total useful lifetime of the first motor, and the energy consumption of the second motor may be extrapolated over the expected total useful lifetime of the second motor. The expected total useful lifetime of the second motor may be different than the expected total useful lifetime of the first motor. In other words, an extrapolated energy consumption amount of a given motor over the expected total useful lifetime of that particular motor may be determined based on the estimated energy consumption amount of that particular motor over the time period.

At least the extrapolated energy consumption amount of each motor (i.e., per motor) of the plurality of motors is indicated 304 for example to a user device. The extrapolated energy consumption amount may be different for different motors. For example, the extrapolated energy consumption amount of the first motor may be different than the extrapolated energy consumption amount of the second motor.

It should be noted that the terms 'first motor', 'second motor', and 'third motor' are used herein the distinguish the different motors, and they do not necessarily mean a specific order of the motors. Similarly, the terms 'first digital twin', 'second digital twin', and 'third digital twin' are used herein the distinguish the different digital twins, and they do not necessarily mean a specific order of the digital twins.

FIG. 4 illustrates a flow chart according to another exemplary embodiment. The functions illustrated in FIG. 4 may be performed by an apparatus such as, or comprised in, a cloud server or any other computing device.

Referring to FIG. 4, the expected total useful lifetime of each motor of the plurality of motors is estimated 401 based at least partly on the process data and a lifetime model of each motor of the plurality of motors. For example, the expected total useful lifetime of the first motor of the plurality of motors may be estimated based at least partly on the process data and a lifetime model of the first motor. The expected total useful lifetime of the second motor of the plurality of motors may be estimated based at least partly on the process data and a lifetime model of the second motor. The expected total useful lifetime of the third motor of the plurality of motors may be estimated based at least partly on the process data and a lifetime model of the third motor.

The functions and/or blocks described above by means of FIGS. 2-4 are in no absolute chronological order, and some of them may be performed simultaneously or in an order differing from the described one. Other functions and/or blocks may also be executed between them or within them. For example, block 401 of FIG. 4 may be performed between blocks 302 and 303 of FIG. 3, or between blocks 301 and 302 of FIG. 3.

A technical advantage provided by some exemplary embodiments is that they may reduce energy consumption and/or physical wear of a motor by improving motor dimensioning, such that an optimal (or near-optimal) motor is selected for a given process. Some exemplary embodiments may help to select a more optimal motor for example in case the process requirements have changed and the initially commissioned motor is not operating optimally. Thus, some exemplary embodiments may help to avoid using incorrectly dimensioned motors that would cause excessive energy usage and/or premature motor wear due to an insufficient or excessive capacity of the motor.

Figure 5:
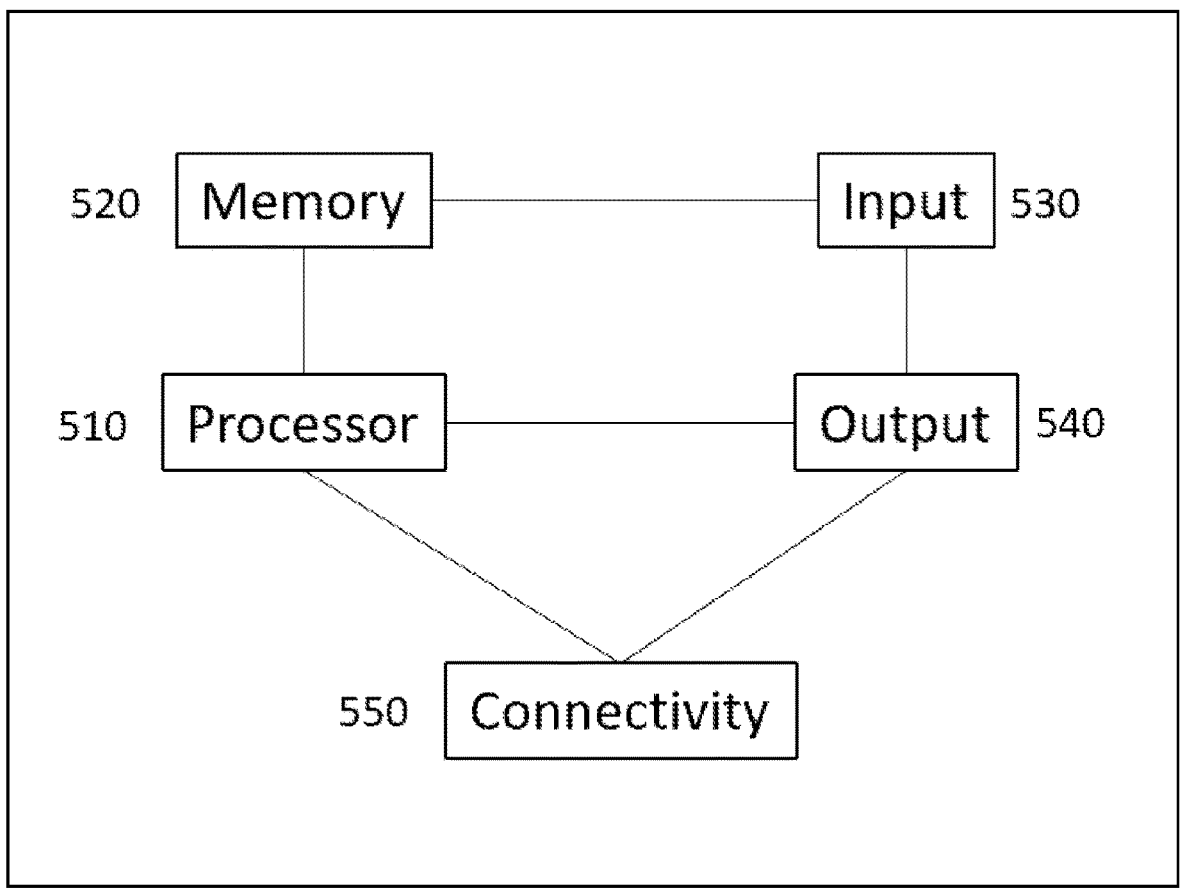
FIG. 5 illustrates an apparatus according to an exemplary embodiment.

FIG. 5 illustrates an apparatus 500, which may be an apparatus such as, or comprised in, a cloud server, a user device, a motor, or any other computing device. The apparatus 500 comprises a processor 510. The processor 510 interprets computer program instructions and processes data. The processor 510 may comprise one or more programmable processors. The processor 510 may comprise programmable hardware with embedded firmware and may, alternatively or additionally, comprise one or more application-specific integrated circuits (ASICs).

The processor 510 is coupled to a memory 520. The processor is configured to read and write data to and from the memory 520. The memory 520 may comprise one or more memory units. The memory units may be volatile or non-volatile. It is to be noted that in some exemplary embodiments there may be one or more units of non-volatile memory and one or more units of volatile memory, or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 520 stores computer readable instructions that are executed by the processor 510. For example, non-volatile memory stores the computer readable instructions and the processor 510 executes the instructions using volatile memory for temporary storage of data and/or instructions.

The computer readable instructions may have been pre-stored to the memory 520 or, alternatively or additionally, they may be received, by the apparatus, via an electromagnetic carrier signal and/or may be copied from a physical entity such as a computer program product. Execution of the computer readable instructions causes the apparatus 500 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 500 may further comprise, or be connected to, an input unit 530. The input unit 530 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 530 may comprise an interface to which external devices may connect to.

The apparatus 500 may also comprise an output unit 540. The output unit may comprise or be connected to one or more displays capable of rendering visual content, such as a light emitting diode (LED) display, a liquid crystal display (LCD) and/or a liquid crystal on silicon (LCoS) display. The output unit 540 may further comprise one or more audio outputs. The one or more audio outputs may be for example loudspeakers.

The apparatus 500 further comprises a connectivity unit 550. The connectivity unit 550 enables wired and/or wireless connectivity to one or more external devices. The connectivity unit 550 may comprise at least one transmitter and at least one receiver that may be integrated to the apparatus 500 or that the apparatus 500 may be connected to. The at least one transmitter comprises at least one transmission antenna, and the at least one receiver comprises at least one receiving antenna. The connectivity unit 550 may comprise an integrated circuit or a set of integrated circuits that provide the communication capability for the apparatus 500. Alternatively, the connectivity may be a hardwired application-specific integrated circuit (ASIC). The connectivity unit 550 may comprise one or more components such as a power amplifier, digital front end (DFE), analog-to-digital converter (ADC), digital-to-n analog converter (DAC), frequency converter, (de)modulator, and/or encoder/decoder circuitries, controlled by the corresponding controlling units.

It is to be noted that the apparatus 500 may further comprise various components not illustrated in FIG. 5. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus (es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor and at least one memory including computer program code, wherein the at least one processor, when executing the computer program code, is configured to:
    obtain a set of process data associated with an industrial process by using an initially commissioned motor with the industrial process, wherein the set of process data includes measured values associated with the industrial process over a time period;
    receive, from a digital twin database, a plurality of digital twins for a plurality of motors that are selectable for replacing the initially commissioned motor in the industrial process,
    estimate at least an energy consumption of each motor of the plurality of motors over the time period by simulating the industrial process based at least partly on the set of process data and the plurality of digital twins associated with the plurality of motors, wherein the plurality of digital twins includes at least a first digital twin of a first motor and a second digital twin of a second motor different to the first motor;
    extrapolate at least the energy consumption of the each motor of the plurality of motors over an expected total useful lifetime of the each motor of the plurality of motors;
    indicate at least the extrapolated energy consumption of the each motor of the plurality of motors;
    select a motor from the plurality of motors based on the extrapolated energy consumption; and
    control the selected motor using control parameters of the selected motor.

2. The apparatus of claim 1, wherein the processor is further configured to:
    estimate maintenance needs of the each motor of the plurality of motors over the time period based at least partly on the set of process data and the plurality of digital twins;
    extrapolate the maintenance needs of the each motor of the plurality of motors over the expected total useful lifetime of the each motor of the plurality of motors; and
    indicate the extrapolated maintenance needs of the each motor of the plurality of motors.

3. The apparatus of claim 1, wherein the maintenance needs of the each motor of the plurality of motors are estimated based at least partly on a temperature of the each motor of the plurality of motors indicated by a corresponding digital twin of the plurality of digital twins.

4. The apparatus of claim 1, wherein the processor is further configured to:
    indicate a motor with a lowest extrapolated energy consumption among the plurality of motors.

5. The apparatus of claim 1, wherein the energy consumption of the each motor of the plurality of motors is extrapolated based at least partly on the expected total useful lifetime of the each motor of the plurality of motors, a power of the each motor of the plurality of motors, and the time period for which the measured values are obtained.

6. The apparatus of claim 1, wherein the initially commissioned motor is included in the plurality of motors, and wherein the energy consumption of the initially commissioned motor is estimated based at least partly on the set of process data and a third digital twin of the initially commissioned motor.

7. The apparatus of claim 1, wherein the processor is further configured to:
    estimate the energy consumption of the initially commissioned motor over the time period by using the initially commissioned motor with the industrial process during the time period;
    extrapolate the energy consumption of the initially commissioned motor over an expected total useful lifetime of the initially commissioned motor; and indicate the extrapolated energy consumption of the initially commissioned motor.

8. The apparatus of claim 1, wherein the energy consumption of the each motor of the plurality of motors is estimated by running in parallel simulations of the industrial process for each digital twin of the plurality of digital twins.

9. The apparatus of claim 1, wherein the process data includes measured values for at least one of: speed, torque, temperature, switching frequency, slip, and/or flux over the time period.

10. The apparatus of claim 9, wherein the process data further includes measured values for environmental conditions associated with the industrial process over the time period.

11. The apparatus of claim 1, wherein the processor is further configured to:
  estimate the expected total useful lifetime of the each motor of the plurality of motors based at least partly on the process data and a lifetime model of the each motor of the plurality of motors.

12. A method comprising:
  obtaining a set of process data associated with an industrial process by using an initially commissioned motor with the industrial process, wherein the set of process data includes measured values associated with the industrial process over a time period;
  receiving, from a digital twin database, a plurality of digital twins for plurality of motors that are selectable for replacing the initially commissioned motor in the industrial process,
  estimating at least an energy consumption of each motor of the plurality of motors over the time period by simulating the industrial process based at least partly on the set of process data and the plurality of digital twins associated with the plurality of motors, wherein the plurality of digital twins includes at least a first digital twin of a first motor and a second digital twin of a second motor different to the first motor;
  extrapolating at least the energy consumption of the each motor of the plurality of motors over an expected total useful lifetime of the each motor of the plurality of motors;
  indicating at least the extrapolated energy consumption of the each motor of the plurality of motors;
  selecting a motor from the plurality of motors based on the extrapolated energy consumption; and
  controlling the selected motor using control parameters of the selected motor.

13. A non-transitory computer readable medium comprising program instructions that cause an apparatus when the program instructions are executed by at least one processor of the apparatus, to perform at least the following:
  obtaining a set of process data associated with an industrial process by using an initially commissioned motor with the industrial process, wherein the set of process data includes measured values associated with the industrial process over a time period;
  receiving, from a digital twin database, a plurality of digital twins for a plurality of motors that are selectable for replacing the initially commissioned motor in the industrial process,
  estimating at least an energy consumption of each motor of the plurality of motors over the time period by simulating the industrial process based at least partly on the set of process data and the plurality of digital twins associated with the plurality of motors, wherein the plurality of digital twins includes at least a first digital twin of a first motor and a second digital twin of a second motor different to the first motor;
  extrapolating at least the energy consumption of the each motor of the plurality of motors over an expected total useful lifetime of the each motor of the plurality of motors;
  indicating at least the extrapolated energy consumption of the each motor of the plurality of motors;
  selecting a motor from the plurality of motors based on the extrapolated energy consumption; and
  controlling the selected motor using control parameters of the selected motor.

14. A system comprising:
  at least a cloud server and a user device;
  wherein the cloud server is configured to:
    obtain a set of process data associated with an industrial process by using an initially commissioned motor with the industrial process, wherein the set of process data includes measured values associated with the industrial process over a time period;
    receive, from a digital twin database, a plurality of digital twins for a plurality of motors that are selectable for replacing the initially commissioned motor in the industrial process,
    estimate at least an energy consumption of each motor of the plurality of motors over the time period by simulating the industrial process based at least partly on the set of process data and the plurality of digital twins associated with the plurality of motors, wherein the plurality of digital twins includes at least a first digital twin of a first motor and a second digital twin of a second motor different to the first motor;
    extrapolate at least the energy consumption of the each motor of the plurality of motors over an expected total useful lifetime of the each motor of the plurality of motors; and
    indicate, to the user device, at least the extrapolated energy consumption of the each motor of the plurality of motors;
  wherein the user device is configured to:
    display, to a user, at least the extrapolated energy consumption of the each motor of the plurality of motors;
  wherein the cloud server is also configured to:
    select a motor from the plurality of motors based on the extrapolated energy consumption; and
    control the selected motor using control parameters of the selected motor.

* * * * *